United States Patent
Zhao et al.

(10) Patent No.: US 9,420,441 B2
(45) Date of Patent: Aug. 16, 2016

(54) SYSTEM AND METHOD FOR CONTENT AND APPLICATION ACCELERATION IN A WIRELESS COMMUNICATIONS SYSTEM

(75) Inventors: Jim Zhao, Los Altos, CA (US); Guo-Qiang Wang, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 1568 days.

(21) Appl. No.: 12/831,965

(22) Filed: Jul. 7, 2010

(65) Prior Publication Data
US 2012/0011271 A1 Jan. 12, 2012

(51) Int. Cl.
*G06F 15/16* (2006.01)
*H04W 4/18* (2009.01)
*H04L 29/08* (2006.01)

(52) U.S. Cl.
CPC ............. *H04W 4/18* (2013.01); *H04L 67/2842* (2013.01)

(58) Field of Classification Search
CPC ............................. H04L 67/2842; H04W 4/18
USPC ......................................... 709/217, 232, 234
See application file for complete search history.

(56) References Cited

U.S. PATENT DOCUMENTS 7,751,328 B2 * 7/2010 Kloth ............................. 370/235
7,834,784 B1 * 11/2010 Zhang et al. .................... 341/79
2004/0068579 A1   4/2004 Marmigere et al.
2004/0098509 A1 * 5/2004 Alfano .......................... 709/249
2007/0276823 A1 * 11/2007 Borden et al. ..................... 707/5
2008/0228939 A1   9/2008 Samuels et al.
2009/0271527 A1   10/2009 Appelman

FOREIGN PATENT DOCUMENTS

CN          1484155       3/2004
WO       03/092166 A1    11/2003
WO      2009/152865 A2   12/2009

OTHER PUBLICATIONS

"PCT International Search Report," International Application No. PCT/CN2011/075593, Applicant: Huawei Technologies Co., Ltd., et al., mailing date: Sep. 29, 2011, 3 pages.
Supplementary Partial European Search Report, Application No. EP 11 80 3113.7, Dated Sep. 11, 2013, 10 pages.

* cited by examiner

*Primary Examiner* — Brian J Gillis
*Assistant Examiner* — Austin Moreau
(74) *Attorney, Agent, or Firm* — Slater Matsil, LLP

(57) ABSTRACT

A system and method for content and application acceleration in a wireless communications system are provided. A method for transmitting data includes receiving a block of data from a content provider, generating a signature from the block of data, and determining if the signature exists in a content cache. The content cache includes previously transmitted signatures and blocks of data associated with the previously transmitted signatures. The method also includes if the signature exists in the content cache, saving the signature but not the block of data in a buffer. The method further includes if the signature does not exist in the content cache, saving the block of data in the buffer. The method additionally includes transmitting contents of the buffer over a backhaul link.

25 Claims, 8 Drawing Sheets

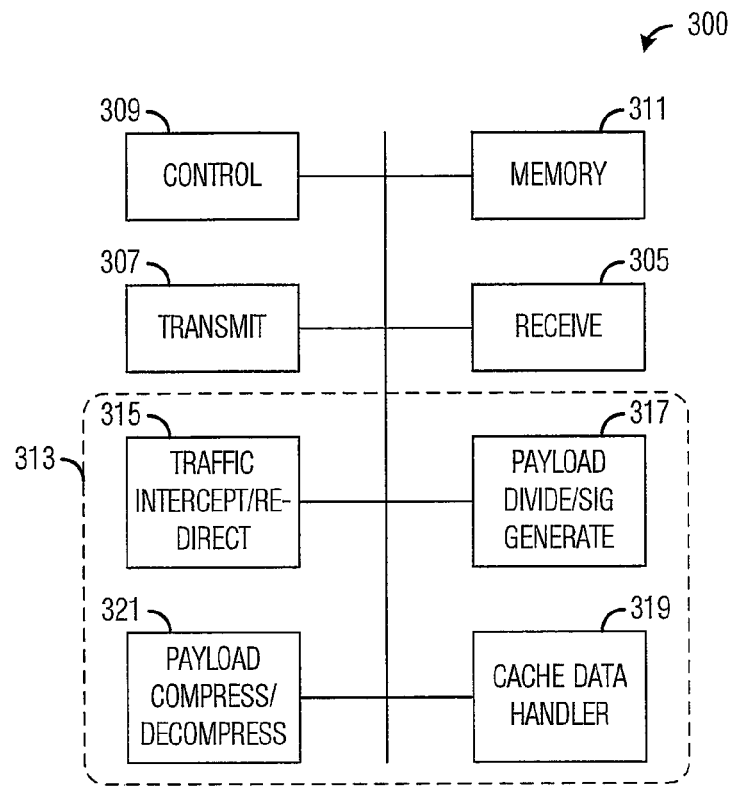
*Fig. 3a*
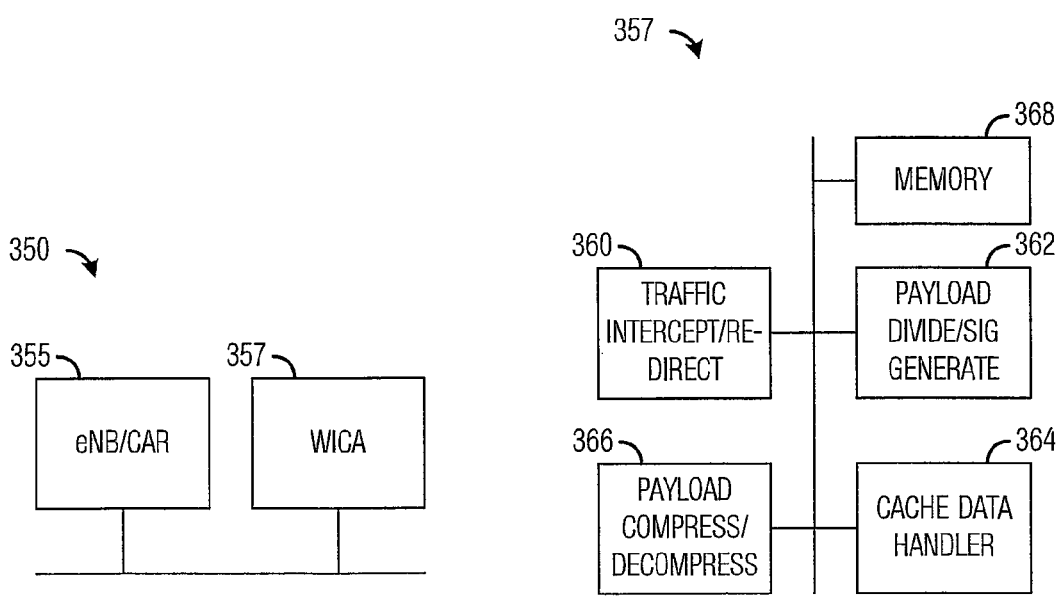
*Fig. 3b*
*Fig. 3c*

SYSTEM AND METHOD FOR CONTENT AND APPLICATION ACCELERATION IN A WIRELESS COMMUNICATIONS SYSTEM

TECHNICAL FIELD

The present invention relates generally to a system and method for digital communications, and more particularly to a system and method for content and application acceleration in a wireless communications system.

BACKGROUND

As mobile communications devices, also commonly referred to as User Equipment (UE), mobile stations, terminals, smart phones, and so forth, become more technologically advanced they are becoming capable of providing more than just voice connectivity. In addition to providing voice connections, the technologically advanced mobile communications devices may enable users to web surf, stream multimedia, share images, serve as access points for computers, and so forth, at continually increasing data rates.

Studies have shown that the world-wide market penetration of advanced mobile communications devices will double in the next few years, increasing from approximately 16 percent of the total mobile communications devices market to about 37 percent of the total mobile communications devices market. Furthermore, data (e.g., web-data, multimedia, images, computer data, and so on) may double each year, every year, for the immediate future.

As an example, mobile Internet has become a common platform to allow users to share information and content using advanced mobile communications devices. Streaming video applications, based on hyper-text transfer protocol (HTTP)/transmission control protocol (TCP), are becoming a dominant traffic pattern in mobile Internet. However, these applications may consume a considerable amount of bandwidth.

Therefore, deployment of such large numbers of the advanced mobile communications devices may place a huge burden on bandwidth capabilities of wireless communications systems, which must continue to increase bandwidth capabilities to ensure adequate performance to satisfy user demands.

SUMMARY OF THE INVENTION

These and other problems are generally solved or circumvented, and technical advantages are generally achieved, by preferred embodiments of the present invention which provide a system and method for content and application acceleration in a wireless communications system.

In accordance with a preferred embodiment of the present invention, a method for transmitting data is provided. The method includes receiving a block of data from a content provider, generating a signature from the block of data, and determining if the signature exists in a content cache. The content cache includes previously transmitted signatures and blocks of data associated with the previously transmitted signatures. The method also includes if the signature exists in the content cache, saving the signature but not the block of data in a buffer. The method further includes if the signature does not exist in the content cache, saving the block of data in the buffer. The method additionally includes transmitting contents of the buffer over a backhaul link.

In accordance with another preferred embodiment of the present invention, a method for processing data is provided. The method includes requesting content from a provider, receiving a transmission over a backhaul link, the transmission being based on the request, and determining if the transmission comprises a signature without a block of data or a signature and a block of data. The method further includes if the transmission comprises the signature without a block of data, retrieving an associated block of data from a content cache based on the signature. The method also includes if the transmission comprises the signature and the block of data, saving the signature and the block of data in the content cache. The method additionally includes processing the block of data.

In accordance with another preferred embodiment of the present invention, a communications device is provided. The communications device includes a receiver, a transmitter, a controller coupled to the transmitter and to the receiver, and a content acceleration unit coupled to the controller, to the transmitter, and to the receiver. The receiver receives incoming information from a data input port, the transmitter transmits outgoing information to a data output port, and the controller controls transmissions to and from other communications devices. The content acceleration unit reduces a bandwidth utilization of a backhaul link in a wireless communications system by compressing blocks of data provided by a content provider based on a request from a user.

An advantage of an embodiment is that bandwidth utilization over a backhaul link of a wireless communications system may be significantly reduced, which may allow the wireless communications system to support a larger number of users. Furthermore, with the reduced bandwidth utilization, an operator of the wireless communications system may be able to delay upgrades to the infrastructure of the wireless communications system, thereby reducing costs.

A further advantage of an embodiment is that there is no protocol barrier to reducing the bandwidth utilization of the backhaul link.

Yet another advantage of an embodiment is that small changes in content does not affect the overall performance much since small changes may result in small changes in the cached data.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 3a is a diagram of a communications controller with an integrated WICA unit;

FIG. 3b is a diagram of a portion of a wireless communications system, wherein wireless communications system includes communications controllers with co-located WICA units;

FIG. 3c is a diagram of a detailed view of WICA unit shown in FIG. 3b;

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a wireless communications system that supports communications devices with data capability, i.e., third-generation (3G) and fourth-generation (4G) communications devices. The invention may also be applied, however, to wireless communications systems that support data capable communications devices in general.

Figure 1:
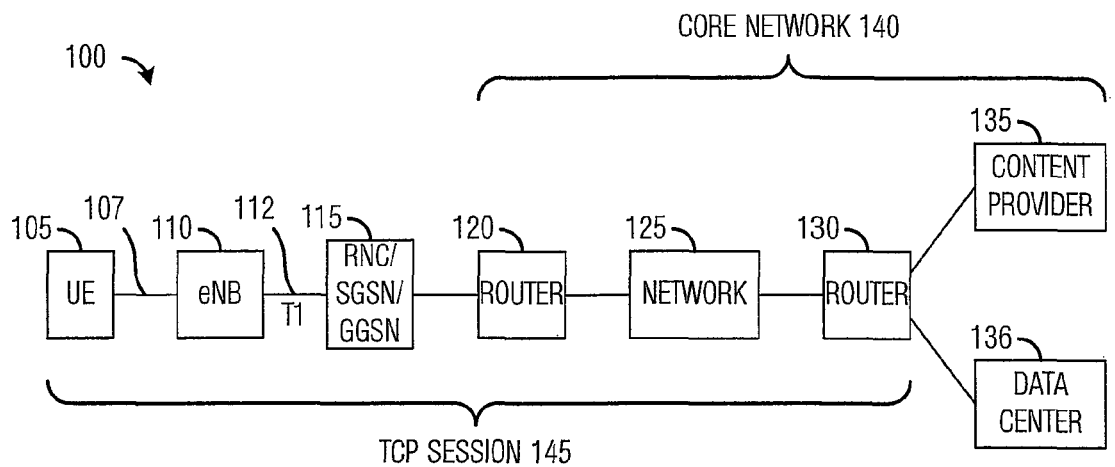
FIG. 1 is a diagram of a high-level view of a wireless communications system.

FIG. 1 illustrates a high-level view of a wireless communications system 100. Wireless communications system 100 includes a UE 105 (i.e., a communications device, which may or may not be data capable (a smart phone)). UE 105 may be served wirelessly (by link 107) by an enhanced Node B (eNB) 110. eNB 110 may also be referred to as a base station, a controller, a communications controller, and so forth. eNB 110 may control communications to and from UE 105. As such, eNB 110 controls the network access of UE 105. eNB 110 may serve a number of UEs, depending on a configuration of wireless communications system 100, time of day, and so forth.

eNB 110 may be connected (by link 112) to a content aware device (CAD), such as a radio network controller (RNC), serving GPRS support node (SGSN), or gateway GPRS support node (GGSN) 115. Additional examples of a CAD may be a Long Term Evolution (LTE) service architecture evolution (SAE) gateway, a packet gateway, a content access router, or an IP router. Link 112 may be commonly referred to as a backhaul link. Typically, the connection between eNB 110 and RNC/SGSN/GGSN 115 may be a wireline connection, for example, a low-bandwidth connection (e.g., a T1 or E1 link) or a high-bandwidth connection (e.g., point-to-point fiber or microwave link). While high-bandwidth connections are available, due to economic reasons (e.g., deployment costs), low-bandwidth connections still dominate. Although shown as a single entity, RNC/SGSN/GGSN 115 may be separate entities or a combination thereof.

RNC/SGSN/GGSN 115 may be connected to a first router 120, which in turn, may be connected to a network 125. Network 125 may be the Internet, a private network, or a combination thereof. Network 125 may be connected to a second router 130, which may be connected to a content provider 135, a data center 136, or so forth. First router 120, network 125, second router 130, content provider 135, and data center 136 may make up a core network 140. Interconnectivity between components of core network 140 is generally made up of high-bandwidth wireline connections and typically does not present a limitation to the performance of wireless communications system 100.

A connection between UE 105 and either content provider 135 or data center 136 may be a single TCP session 145, wherein a TCP packet may be transported from content provider 135 or data center 136 to UE 105 or vice versa. Although the TCP packet may take multiple hops between content provider 135 or data center 136 to UE 105, the TCP packet traverses single TCP session 145.

Since wireless connections (e.g., link 107) generally may not be capable of supporting as much bandwidth as a wireline connection, the wireless connection may be a bottleneck of wireless communications system 100. However, since a wireless connection between UE 105 and eNB 110 is generally not shared with others, the wireless connection may not be a significant bottleneck.

Although a backhaul link (e.g., link 112) may be a wireline connection with a considerably higher bandwidth than a wireless link (e.g., link 107), eNB 110 may serve a large number of UEs, with each UE having one or more active connection to core network 140. As an example, let link 112 be a 1 Mbps link, but if eNB 110 is serving 20 UEs with each demanding maximum bandwidth, each UE may be allocated a maximum bandwidth of 50 kbps, which may or may not be adequate for the applications executing on the UEs. Therefore, an aggregate bandwidth from each UE being served by eNB 110 may exceed the bandwidth of the backhaul link, thereby making the backhaul link significant bottleneck of wireless communications system 100.

Even as providers are planning to replace low-bandwidth backhaul links with high-bandwidth backhaul links, a coverage area of an eNB is becoming smaller. It is predicted that micro or pico eNBs will become significant players in next generation wireless communications systems. Smaller coverage areas imply an increased number of eNBs in order to provide a similar degree of coverage, and increasing the number of eNBs also increases the number of backhaul links. Therefore, to reduce deployment costs, providers may continue to use low-bandwidth backhaul links.

Figure 2:
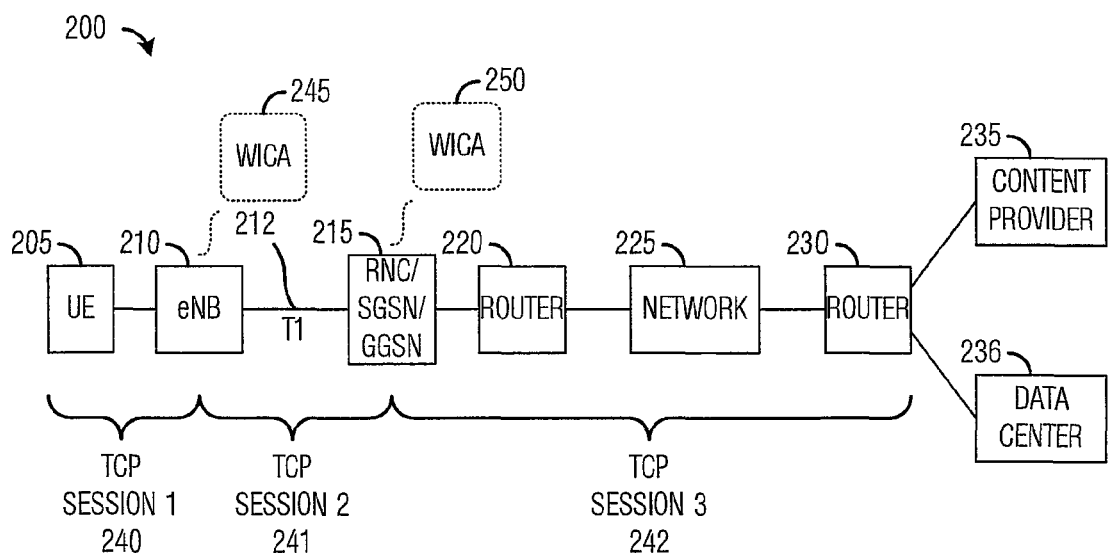
FIG. 2 is a diagram of a wireless communications system, wherein wireless communications system includes enhancements for reducing bandwidth utilization of a backhaul link.

FIG. 2 illustrates wireless communications system 200, wherein wireless communications system 200 includes enhancements for reducing bandwidth utilization of a backhaul link. As shown in FIG. 2, a connection between UE 205 and either a content provider 235 or data center 236 may occur through connections over an eNB 210, a RNC/SGSN/GGSN 215, a first router 220, a network 225, and a second router 230 comprises three TCP sessions (TCP session 1 240, TCP session 2 241, and TCP session 3 242 rather than a single TCP session (such as TCP session 145 shown in FIG. 1)). With TCP session 1 240 may be between UE 205 and eNB 210, TCP session 2 241 may be between eNB 210 and RNC/SGSN/GGSN 215, and TCP session 3 242 may be between RNC/SGSN/GGSN 215 and second router 230.

By breaking up a single TCP session (such as TCP session 145) into multiple TCP sessions, it may be easier to control as well as modify information being transported on the TCP sessions. For example, if TCP packets are transported over a single TCP session, in order to modify information being transported over the single TCP session, it may be necessary to monitor all TCP traffic occurring over the single TCP session, buffer desired TCP traffic, modify the desired TCP traffic, and re-inject the modified TCP traffic back into the single TCP session.

However, if the single TCP session were to be broken up into multiple TCP sessions with a first session terminating at a point where TCP packets are to be inspected and modified and a second session originating at the point, then it may not be necessary to actively monitor all TCP traffic since TCP traffic occurring over the first session would automatically be buffered, where the TCP traffic may be inspected and modified as needed and then injected into the second TCP session.

According to an embodiment, wireless intelligent content acceleration (WICA) units 245 and 250 may be added to both ends of link 212 (i.e., the backhaul link) to reduce backhaul link bandwidth utilization. As shown in FIG. 2, eNB 210 is at a first end of the backhaul link and RNC/SGSN/GGSN 215 is at a second end of the backhaul link. Although shown in FIG. 2 to be attached to eNB 210 and RNC/SGSN/GGSN 215, WICA units 245 and 250 may be implemented as integral part of eNB 210 and RNC/SGSN/GGSN 215, for example, WICA units 245 and 250 may be implemented as software, hardware, or firmware in eNB 210 and RNC/SGSN/GGSN 215.

According to an alternative embodiment, WICA units 245 and 250 may be standalone hardware positioned on the backhaul link between eNB 210 and RNC/SGSN/GGSN 215. According to yet another alternative embodiment, WICA units 245 and 250 may be implemented differently. As an example, WICA unit 245 may be implemented as software, hardware, or firmware in eNB 210, while WICA unit 250 may be implemented as a standalone hardware positioned on the backhaul link between eNB 210 and RNC/SGSN/GGSN 215.

According to yet another alternative embodiment, WICA units 245 and 250 may partially implemented as software, hardware, or firmware in eNB 210 and RNC/SGSN/GGSN 215 and partially as standalone hardware positioned on the backhaul link between eNB 210 and RNC/SGSN/GGSN 215. WICA units 245 and 250 may be implemented purely in software, an add-on service card, a standalone hardware device, or a combination thereof.

WICA units 245 and 250 may be used to monitor, intercept, and redirect TCP traffic, to divide data payloads into multiple blocks of a specified size, to generate a signature for each block based on a signature generating function, to compare signatures for a block with stored signatures that are stored in a cache-like manner. WICA units 245 and 250 may also be used to retrieve stored data based on a signature. Furthermore, WICA units 245 and 250 may be used to create and maintain user flow signature (UFS) profiles for users (UEs), wherein the UFS may be used to guide relaying between UE and CAD. The UFS profile includes a User device ID (e.g., MAC address of user device), a Flow ID (e.g., IP address+port ID, or H(IP address, Port ID) where H is a hash function), a Signature of the data flow, or a combination thereof.

WICA units 245 and 250 may not need to implement identical operations. For example, since in some applications, such as web-browsing, a disproportional amount of backhaul bandwidth may be dedicated to transmissions to UE 205 as opposed to transmissions from UE 205. In such a situation, WICA unit 245 may not need to implement a full set of WICA operations. For example, WICA unit 245 may not need to be able to divide data payloads, generate signatures, and so forth. Similarly, WICA unit 250 (located at or near RNC/SGSN/GGSN 215) may not need to restore stored data based on a signature. Although the capabilities of the WICA units may not need to be identical, the WICA units spanning the backhaul link need to be compatible symmetrically to ensure compatibility of the operations. Furthermore, in applications wherein backhaul bandwidth is about equal, the WICA units spanning the backhaul link may have identical capability as well as symmetrically compatible.

The use of WICA can significantly increase the capacity of backhaul links, as well as reduce round trip time delays and packet loss ratios. Therefore, WICA can help solve the bandwidth bottleneck at the backhaul link.

A detailed discussion of WICA units and their operation is provided below.

FIG. 3*a* illustrates a communications controller 300 with an integrated WICA unit. Communications controller 300 may be an eNB, such as eNB 210, or a CAD, such as RNC/SGSG/GGSN 215, with an integrated WICA unit to reduce backhaul link bandwidth utilization. According to an embodiment, in order to implement reduced backhaul link bandwidth utilization, both ends of the backhaul link, i.e., the eNB and the CAD, may need to include a WICA unit (either integrated, a standalone unit, or a combination thereof).

Communications controller 300 may include a receive unit 305 that may be used to receive incoming information, generally, in the form of IP packets. Communications controller 300 may also include a transmit unit 307 that may be used to transmit outgoing information. Receive unit 305 and transmit unit 307 may be wireline and/or wireless units. In general, TCP packets may arrive at communications controller 300 through receive unit 305 and may leave communications controller 300 through transmit unit 307.

Communications controller 300 also includes a control unit 309. Control unit 309 may be implemented using a general purpose or special purpose processor or controller, combinatorial logic, state machines, or a combination thereof. Control unit 309 may be used to control the operation of communications controller 300. For example, if communications controller 300 is an eNB, then control unit 309 may be used to grant and schedule transmission opportunities to UEs served by control unit 309, process attach requests, participate in handovers, and so forth, while if communications controller 300 is a CAD, then control unit 309 may be used to compute routes based on a routing function, detect faults, serve as anchors for UEs, and so on.

Communications controller 300 also includes a memory 311 that may be used to store configuration information, routing information, UE specific information, scratch memory, buffer space for transmissions, and so forth. Memory 311 may be a combination of read-only memory, random access memory, programmable read-only memory, and so on.

Communications controller 300 also includes a WICA unit 313 for use as a content acceleration unit. As shown in FIG. 3*a*, WICA unit 313 may be implemented as a number of discrete units with each discrete unit used for specific WICA operations. WICA unit 313 may also be implemented as a single unit that may be used for a combination of specific WICA operations. Therefore, also the discussion focuses on a number of discrete units, WICA unit 313 may be implemented as a single unit or a number of units with some units being used for several specific WICA operations.

According to an embodiment, WICA unit 313 may be used to perform inspection and interception of TCP flows, process TCP flow signatures and content cache between eNB and CAD. Specifically, WICA unit 313 may perform the following operations: 1) TCP traffic interception and re-direction; 2) TCP payload division and signature generation; 3) Content cache handling; and 4) TCP payload compression and decompression.

WICA unit 313, when implemented as a number of discrete units with each discrete unit used for specific WICA operations may include a traffic intercept/re-direct unit 315, a, a payload divide/signature generate unit 317, a cache data handler unit 319, and a payload compress/decompress unit 321. Although FIG. 3*a* illustrates four discrete units in WICA unit 313, it may be possible to further divide some of the units into sub-units or combine some of the units into super-units. Therefore, the illustration and discussion of four discrete units should not be construed as being limiting to either the scope or the spirit of the embodiments.

Traffic intercept/re-direct unit 315 may be used to intercept and re-direct all or selected TCP traffic to other units in WICA unit 313. Traffic intercept/re-direct unit 315 may reside in an eNB or a CAD. Alternatively, the WICA device may also reside in the eNB or the CAD or be external to the eNB or the CAD as a separate standalone unit. Examples of protocols used to re-direct the TCP traffic may include: 1. web cache communications protocol (e.g., WCCP 2.0), 2. a proprietary proxy re-direction protocol, 3. an internal application programming interface (API), or so forth.

According to an embodiment, traffic intercept/re-direct unit 315 (or equivalent unit) may already be present in some communications controllers. If traffic intercept/re-direct unit 315 is already present in a communications controller, traffic intercept/re-direct unit 315 may not be included in WICA unit 313.

With a wireless device, such as an eNB or a RNC, where traditionally TCP packets are not exposed, some additional processing may need to be performed to extract TCP packets from radio wave protocols and trunk tunnel protocols. For example, in an eNB, deep packet inspection (DPI) may be used to identify TCP flows from a protocol stack, such as with either a packet data convergence protocol (PDCP) for an air interface to UEs or GPRS tunneling protocol user data tunneling (GTP-U) for a trunk interface to the RNC or a gateway, and an interworking function (IWF) module may be implemented to decapsulate/encapsulate IP packets between WICA unit 313 and PDCP/GTP-U relay modules. The IWF module may intercept TCP flows, re-direct the TCP flows to other units in WICA unit 313 to perform WICA processing, and re-dispatch the TCP flows, to PDCP/GTP-U protocol stack.

Payload divide/signature generate unit 317 may be used to receive and process TCP traffic re-directed by traffic intercept/re-direct unit 315. Once payload divide/signature generate unit 317 receives TCP traffic, payload divide/signature generate unit 317 break the TCP session into three TCP sessions. The breaking of the TCP session into three TCP sessions may involve payload divide/signature generate unit 317 replacing an original TCP destination address contained in the TCP traffic with its own address, foaming a first TCP session. Payload divide/signature generate unit 317 may then create a second TCP session between itself and its remote peer (e.g., an alternate payload divide/signature generate unit 317 located at the CAD if payload divide/signature generate unit 317 is located at an eNB or an alternate payload divide/signature generate unit 317 at the eNB if payload divide/signature generate unit 317 is located at a CAD). The remote peer of payload divide/signature generate unit 317 may then create a third TCP session connecting itself to the original TCP destination address.

In general, a TCP session between a UE and a server that is intercepted by WICA unit 313 may be broken down into three TCP sessions, with one TCP session between the UE and a WICA unit located at an eNB serving the UE, another TCP session between the WICA unit located at the eNB and a WICA unit located at a CAD, and another TCP session between WICA unit located at the CAD and the server.

Once payload divide/signature generate unit 317 gets the re-directed TCP session broken down into three separate TCP sessions, payload divide/signature generate unit 317 may examine a data payload carried in the three separate TCP sessions and divide (break-up) the data payload into smaller blocks. An algorithm used to divide the data payload may divide the data payload into fixed sized blocks. Alternatively, the algorithm may divide the data payload into variable sized blocks, based on specified binary patterns, for example. A maximum size may be specified for the blocks, with a preferred maximum size being about 400 bytes.

After the data payload has been divided into a number of blocks, a signature may be generated for each block. An algorithm used to generate the signatures should ensure that unique signatures be generated for distinct blocks. According to an embodiment, a hash algorithm, such as a MD5-like hash algorithm may be used on each block to generate a six byte long signature. The signature may be used later for content cache look-up, reduction of backhaul link bandwidth utilization, and so forth.

Cache data handler unit 319 may be used to maintain a content cache. Content cache may be stored in a memory local to WICA unit 313 or it may be formed out of memory 311. Content cache may be relatively large in size and since extremely fast memory may not be needed, content cache may be formed out of secondary memory, such as magnetic disk storage memory, without having to use extremely high-speed memory used in a normal cache.

Cache data handler unit 319 may be used to perform signature queries to the content cache. A signature table may be preserved in a memory (again, local to WICA unit 313 or part of memory 311) that contains pairings consisting of signatures and disk storage locations. Each pairing consists of a signature to a block of data and a location on a disk where the block of data is stored. When a new signature is received, cache data handler unit 319 may insert the signature into the signature table if the signature table is not full. Cache data handler unit 319 may also store a block of data associated with the signature in the content cache and store a location of the block of data in the signature table.

If the signature table is full and the signature is not already in the signature table, then cache data handler unit 319 may need to replace an existing signature in the signature table to make room to store the signature. According to an embodiment, any of a wide range of replacement algorithms, such as first in first out, signature age, signature use (recent usage), or so on, may be used to select a signature to be replaced.

According to an embodiment, when a first signature is received, insert the first signature into the signature table unless the signature table is full. If the signature table is full, select a signature for removal using a replacement algorithm. If the first signature is already in the signature table (i.e., the first signature matches a signature already stored in the signature table), the first signature alone may be stored in a signature-data buffer, which may also be local to WICA unit 313 or a part of memory 311. When a second signature (associated with another block of data from the same TCP session as the first signature) arrives, search the signature table for the second signature. If the second signature is not in the signature table, add the second signature to the signature table, save a block of data associated with the second signature to the content cache, and save both the second signature and the block of data associated with the second signature to the signature-data buffer. Repeat until all blocks of data from the TCP session have been processed.

With all of the blocks of data from the TCP session processed, WICA unit 313 may send the contents of the signature-data buffer to its peer WICA unit. The peer WICA unit may use the contents of the signature-data buffer and its own content cache to reconstruct the blocks of data of the TCP session. The peer WICA unit may then send the blocks of data of the TCP session to an intended destination of the TCP session.

According to an alternative embodiment, rather than processing all of the blocks of data from a TCP session at once, WICA unit 313 and cache data handler unit 319 may process a single block of data from the TCP session at a time and the signature or the signature and the block of data may be transmitted to the peer WICA unit for reconstruction.

In an optimal condition, cache data handler unit 319 may find all of the signatures associated with the blocks of data of the TCP session already located in the signature table. When all of the signatures are already in the signature table, the signature-data buffer will only contain signatures. Therefore, only signatures are transported to the peer WICA unit, thus achieving a maximum TCP acceleration and minimum backhaul link bandwidth utilization.

According to an embodiment, if a number of blocks of data (or associated signatures) are found in the signature table in a continuous block, it may be possible to generate a signature for the continuous block, which may be transmitted. The signature for the continuous block may be a signature for the signatures, thereby creating a super compressed data block from the number of blocks of data.

Payload compress/decompress unit 321 may be used to compress blocks of data that have signatures not already in the signature table. As discussed previously, if a block of data has a signature that is not in the signature table, the block of data (and its signature) will be transported to the peer WICA unit. However, instead of transporting the block of data in uncompressed form, the block of data may be compressed prior to transmission. Depending on the type of data in the block of data and a compression algorithm being used, compressing the block of data prior to transmission may reduce the amount of data being transmitted by a significant percentage, up to 90 percent in some cases.

At the peer WICA unit, a corresponding payload compress/decompress unit may be used to decompress the compressed data. According to an embodiment, the corresponding payload compress/decompress unit may use the same algorithm (or a corresponding decompression algorithm) to decompress the compressed data.

FIG. 3b illustrates a portion of a wireless communications system 350, wherein wireless communications system 350 includes communications controllers with co-located WICA units. As shown in FIG. 3b, a communications controller (either an eNB or a CAD) 355 may be co-located with a standalone WICA unit 357. Although WICA unit 357 and communications controller 355 are not integrated into a single unit, they operate in the same manner as if they were integrated into a single unit, as shown in FIG. 3a.

FIG. 3c illustrates a detailed view of WICA unit 357. WICA unit 357 includes a traffic intercept/re-direct unit 360, a payload divide/signature generate unit 362, a cache data handler unit 364, and a payload compress/decompress unit 366 that may operate in a similar fashion to traffic intercept/re-direct unit 315, payload divide/signature generate unit 317, cache data handler unit 319, and payload compress/decompress unit 321 of WICA unit 313.

WICA unit 357 also includes a memory 368. Since WICA unit 357 and communications controller 355 are not integrated into a single unit, using memory located in communications controller 355 may result in very long memory access times, which may negatively impact performance. Therefore, WICA unit 357 may have its own memory for use in storing content cache, signature table, signature-data buffer, scratch memory and so forth. Memory 368 may include read-only memory, random access memory, secondary memory, and so on.

Figure 4:
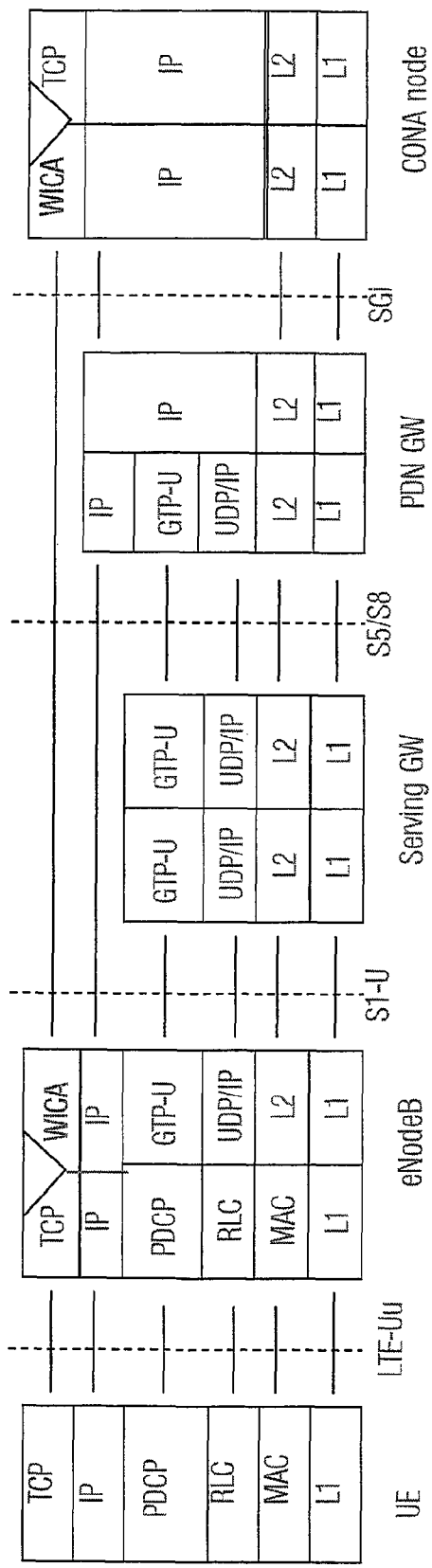
FIG. 4 is a diagram of TCP acceleration provided by WICA.

FIG. 4 illustrates TCP acceleration provided by WICA. Protocol stacks of components of a wireless communications system, including a UE, an eNB, a serving gateway (GW), a packet data network gateway (PDN GW) and a content aware (CONA) node are shown. As shown in FIG. 4, WICA may be applied at the very top of the protocol stacks of the eNB and the CONA node and may be transparent to the UE, the serving GW, and the PDN GW. WICA may be operated in an interworking with a relay function at the eNB and with a TCP session manager at the CONA node. Furthermore, a WICA profile may be switched on a per-UE basis during handovers.

Backhaul link bandwidth utilization may be improved through TCP Receive Window (RWIN) size control, packet loss control, and so forth. When considering RWIN, throughput may be less than or equal to RWIN/RTT, where RTT is round-trip time. Senders should have consistent window size in order to have reliable re-transmission. If RTT is reduced by 50% or more, throughput will increase significantly. When considering packet loss, throughput may be less than or equal to $MSS/(RTT*\sqrt{Ploss})$, where MSS is a maximum segment size and Ploss is a probability of packet loss. If a TCP session is terminated at a wireless gateway or a co-located box), then a TCP re-transmission RTT may be shorted, Ploss is reduced, and packet loss performance is greatly improved.

Figure 5:
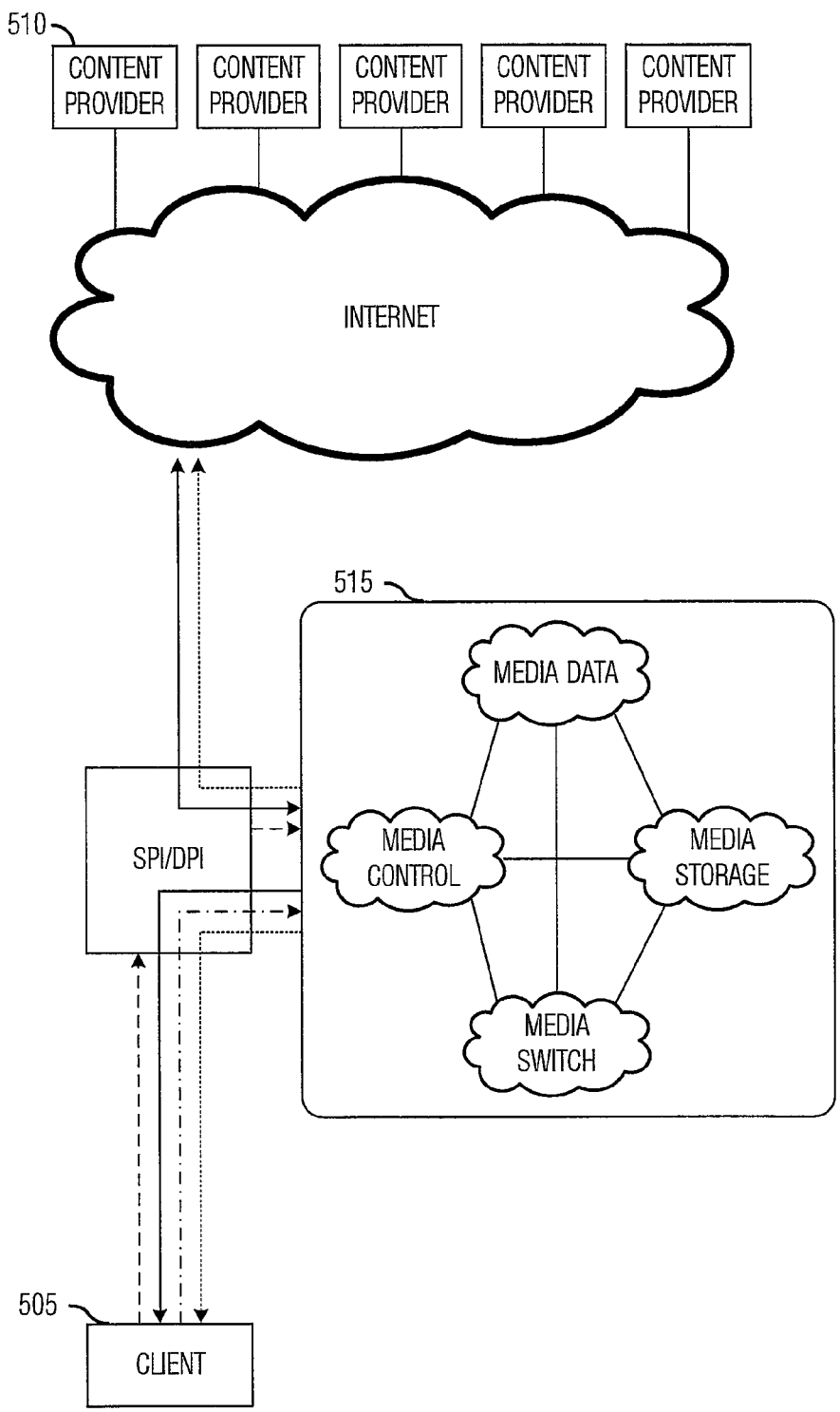
FIG. 5 is a diagram of transparent caching of video on demand (VoD) content.

FIG. 5 illustrates a transparent caching of video on demand (VoD) content. A first client 505 sends a request to a content provider (CP) or a service provider (SP), for example, CP 510. The request may be intercepted and forwarded to a content data network (CDN) 515. For discussion purposes, let the request be a first request for a specific content. Since the request is a first request, the specific content will not be in a content cache. Therefore, CDN 515 determines a content cache miss and fetches the specific content from CP 510.

CDN 515 sends the specific content to first client 505 as well as placing the specific content in the content cache. A second client then requests the same specific content, which may be intercepted and forwarded to CDN 515. CDN 515 detects a content cache hit and fetches the specific content from the content cache and serves the specific content to the second client. According to an embodiment, CDN 515 may need to inform an origin server (OS) when it is serving the second client. Interaction between clients, such as first client 505, and content providers, such as content provider 510, may occur through a service provider interface (SPI) and a deep packet inspection (DPI) unit.

Figure 6:
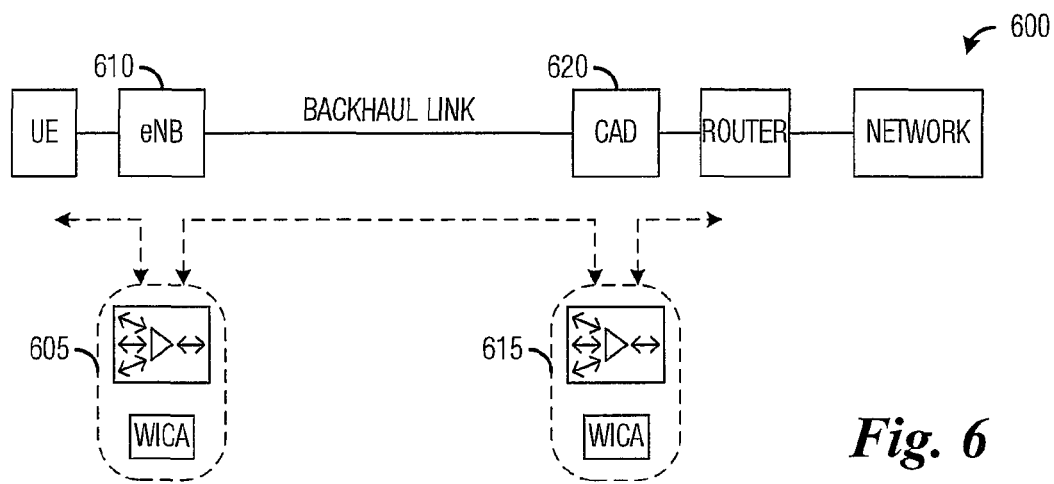
FIG. 6 is a diagram of a portion of a wireless communications system, wherein WICA units are utilized to improve backhaul link bandwidth utilization.

FIG. 6 illustrates a portion of a wireless communications system 600, wherein WICA units are utilized to improve backhaul link bandwidth utilization. As shown in FIG. 6, wireless communications system 600 includes two WICA units, a first WICA unit 605 at an eNB 610 and a second WICA unit 615 at a CAD 620. First WICA unit 605 and second WICA unit 615 may be separate standalone units, integrated with eNB 610 and/or CAD 620, or a combination thereof.

Figures 7A, 7B:
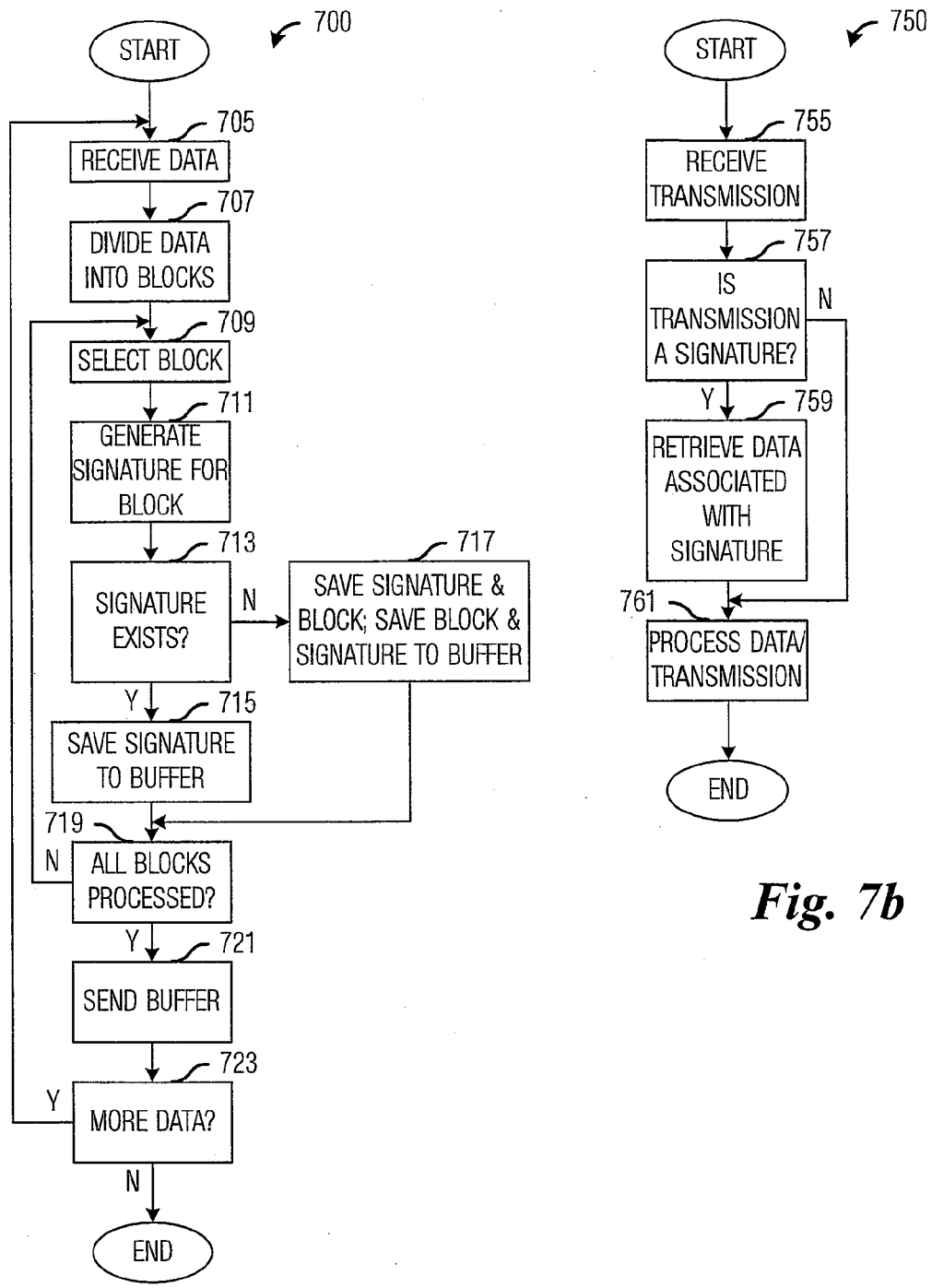
FIG. 7a is a flow diagram of WICA unit operations in improving backhaul link bandwidth utilization.
FIG. 7b is a flow diagram of WICA unit operations in improving backhaul link bandwidth utilization.

FIG. 7a illustrates a flow diagram of WICA unit operations 700 in improving backhaul link bandwidth utilization. WICA unit operations 700 may be indicative of operations occurring in a WICA unit, such as first WICA unit 605 or second WICA unit 615, as the WICA unit performs content caching to improve backhaul link bandwidth utilization at a content end of a TCP session. WICA unit operations 700 may occur while the WICA unit is in a normal operating mode.

WICA unit operations 700 may begin with the WICA unit receiving data from a TCP session (block 705). The data may be as a result of a request from a UE. As an example, the UE may have requested a video to be streamed to the UE, a file to be downloaded to the UE, or so on. The WICA unit may divide the data into multiple blocks (block 707). According to an embodiment, the data may be divided into multiple blocks with each block being the same size. Alternatively, variable sized blocks may be used. As an example, the data may be divided into blocks that are 250 bytes in size.

The amount of compression may be based on the size of the blocks of data. As an example, if a block of data is 240 bytes in size, then a compression ratio of 1−(6/240)=97.5% may be achieved. Similarly, if a block of data is 600 bytes in size, then a compression ratio of 99% is possible, while if a block of data is 6000 bytes in size, then a compression ratio of 99.9% is possible. However, with larger block of data sizes, the hit ratio may suffer.

The WICA unit may select a block for processing (block 709). According to an embodiment, the WICA unit may select the blocks from the multiple blocks in numerical order. The WICA unit may then generate a signature for the selected block (block 711). As discussed previously, the WICA unit may use any of a variety of signature generating functions as long as the signature generating function ensures that a unique block will produce a unique signature. An example of the signature generating function may be a MD5-like hashing function or some other similar hashing function that generates a six byte long signature from a block of data.

As part of content cache management, the WICA unit may, when the content cache or memory used to store the content cache is approaching a specified capacity, execute a content cache purging policy may be applied to remove some signatures and associated blocks of data. Removal of the signatures and associated blocks of data may provide space for new signatures and their associated blocks of data. The purging policy may be based on a first in first out (FIFO), a least recently used (LRU), a segmented LRU, a least frequently used (LFU), or some other technique.

The WICA unit may search in a content cache to determine if the signature is already stored in the content cache (block 713). If the signature is already in the content cache, then the WICA unit has already processed an identical block previously. The WICA unit may store the signature alone in a signature-data buffer (block 715).

The content cache may need to be large to provide a good hit rate, but since the content cache is required only at the WICA units, only a relatively small number of content caches are needed. As an example, if the content cache is to be 500 gigabytes in size with each block of data being 400 bytes, then 2 giga-signatures are needed (or 12 gigabytes of storage is needed for the 2 giga-signatures when each signature is six bytes in size). Compression and special access/search algorithms may be utilized to reduce the size of the content cache as well as the storage for the signatures.

However, if the signature is not already stored in the content cache (block 713), then the WICA unit has not already processed an identical block previously (or it has been such a long time that the signature has been removed from the content cache). The WICA unit may save the signature and the block to the content cache and store the signature and the block to the signature-data buffer (block 717). According to an embodiment, since the signature generating function is available at all WICA units in a wireless communications system, it may not be necessary to save the signature in the signature-data buffer if the block of data is saved in the signature-data buffer. A WICA unit that receives the block of data may be able to generate the signature from the block of data using its own signature generating function (which is identical to the other signature generating functions used in the wireless communications system).

The WICA unit may then perform a check to determine if all of the blocks in the multiple blocks have been processed (block 719). If not all of the blocks have been processed, then the WICA unit may return to block 709 to select another block from the multiple blocks and repeat the signature generation (block 711), signature in content cache determination (block 713), and updating signature-data buffer and content cache (block 715/717).

If all of the blocks have been processed (block 719), then the WICA unit may send the contents of the signature-data buffer to a WICA unit at a client end of the TCP session (block 721). The WICA unit may then perform a check to determine if additional data has arrived (block 723). If additional data has arrived, then the WICA unit may return to block 705 to receive the data. If additional data has not arrived, then WICA unit operations 700 may terminate.

According to an embodiment, instead of waiting until the processing of every block in the multiple blocks is complete, the WICA unit may send a result of block 715/717 immediately to the WICA unit at the client end of the TCP session after each block has been processed. By immediately transmitting the result of block 715/717 (either a signature alone or a signature and block), the signature-data buffer may be eliminated.

According to another embodiment, instead of saving the signature and the block of data in the signature-data buffer, the WICA unit may save only the block of data in the signature-data buffer. The WICA unit may then send the WICA unit at the client end of the TCP session where the signature may be regenerated from the block of data.

FIG. 7b illustrates a flow diagram of WICA unit operations 750 in improving backhaul link bandwidth utilization. WICA unit operations 750 may be indicative of operations occurring in a WICA unit, such as first WICA unit 605 or second WICA unit 615, as the WICA unit performs content caching to improve backhaul link bandwidth utilization at a client end of a TCP session. WICA unit operations 750 may occur while the WICA unit is in a normal operating mode.

WICA unit operations 750 may begin with the WICA unit receiving a transmission from a WICA unit at a content end of the TCP session (block 755). Depending on a content cache, the transmission may either be a signature alone or a signature and a block of data. The WICA unit may perform a check to determine a nature of the transmission (block 757).

If the transmission contains only a signature, then the WICA unit may use the signature to reference its own content cache to retrieve a block of data associated with the signature (block 759). If the transmission contains both a signature and a block of data, then the WICA unit may process the transmission by saving the signature and the block of data in the content cache (block 761). Processing the transmission may further include sending the block of data to an intended recipient of the block of data, e.g., a UE that requested the data. WICA unit operations 750 may then terminate.

According to an embodiment, if the transmission contains only a block of data, processing of the transmission may further include generating a signature from the block of data prior to saving the block of data and the signature (now generated at the WICA unit receiving the transmission instead of being included in the transmission) to the content cache.

According to an alternative embodiment, rather than processing a transmission in a singular fashion, the WICA unit may wait to receive multiple transmissions and then process the multiple transmissions at the same time. As an example, the WICA unit may process the received transmissions in an order in which the transmissions are received, in an order in which the transmissions are transmitted, in an order as specified by an ordering scheme specified in the transmissions, or so on.

Figures 8A, 8B:
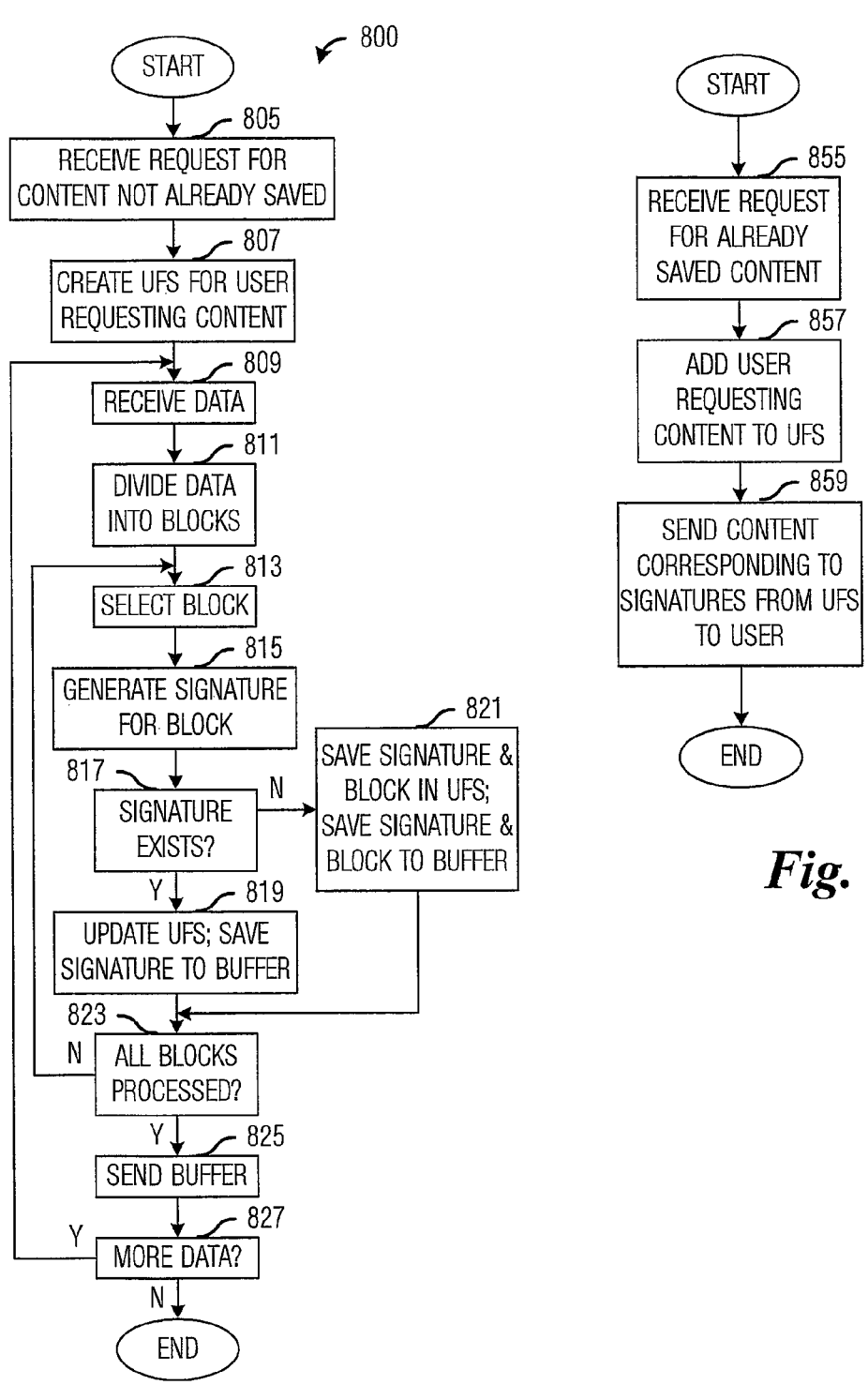
FIG. 8a is a flow diagram of WICA unit operations in transmitting information to a client requesting data from a service.
FIG. 8b is a flow diagram of WICA unit operations in transmitting information to a client requesting data from a service, wherein the data has already been requested by another client.

FIG. 8a illustrates a flow diagram of WICA unit operations 800 in transmitting information to a client requesting data from a service. WICA unit operations 800 may be indicative of operations occurring in a WICA unit, such as first WICA unit 605 or second WICA unit 615, as the WICA unit performs content caching to improve backhaul link bandwidth utilization at a content end of a TCP session. WICA unit operations 800 may occur while the WICA unit is in a normal operating mode. As discussed herein, the TCP session may be shred by a single client.

WICA unit operations 800 may begin with the WICA unit receiving a request for content from a client, where the content is not already present in its content cache (block 805). The WICA unit may create a user-flow signature (UFS) for the client (block 807). The UFS may be used to guide content cache compression, multi-client support, as well as context switches for mobility (handover) support. The UFS may be a portion of a content cache that is used to store signatures associated with a client or clients. After the UFS for the client has been created, the WICA unit may be ready to transmit the content to the client.

The WICA unit may begin to receive data corresponding to the content from a TCP session (block 809). The data may be as a result of the request from the client. As an example, the client may have requested a video to be streamed to the client, a file to be downloaded to the client, or so on. The WICA unit may divide the data into multiple blocks (block 811). According to an embodiment, the data may be divided into multiple blocks with each block being the same size. Alternatively, variable sized blocks may be used.

The WICA unit may select a block for processing (block 813). According to an embodiment, the WICA unit may select the blocks from the multiple blocks in numerical order. The WICA unit may then generate a signature for the selected block (block 815). As discussed previously, the WICA unit may use any of a variety of signature generating functions as long as the signature generating function ensures that a unique block will produce a unique signature. An example of the signature generating function may be a MD5-like hashing function.

The WICA unit may search in a content cache to determine if the signature is already stored in the content cache (block 817). If the signature is already in the content cache, then the WICA unit has already processed an identical block previously. The WICA unit may update the UFS for the client as well as store the signature alone in a signature-data buffer (block 819).

However, if the signature is not already stored in the content cache (block 817), then the WICA unit has not already processed an identical block previously (or it has been such a long time that the signature has been removed from the content cache). The WICA unit may save the signature and the block to the UFS as well as store the signature and the block to the signature-data buffer (block 821).

According to an embodiment, since the signature generating function is available at all WICA units in a wireless communications system, it may not be necessary to save the signature in the signature-data buffer if the block of data is saved in the signature-data buffer. A WICA unit that receives the block of data may be able to generate the signature from the block of data using its own signature generating function (which is identical to the other signature generating functions used in the wireless communications system).

The WICA unit may then perform a check to determine if all of the blocks in the multiple blocks have been processed (block 823). If not all of the blocks have been processed, then the WICA unit may return to block 813 to select another block from the multiple blocks and repeat the signature generation (block 815), signature in content cache determination (block 817), and updating signature-data buffer and content cache (block 819/821).

If all of the blocks have been processed (block 823), then the WICA unit may send the contents of the signature-data buffer to a WICA unit at the client end of the TCP session (block 825). The WICA unit may then perform a check to determine if additional data has arrived (block 827). If additional data has arrived, then the WICA unit may return to block 809 to receive the data. If additional data has not arrived, then WICA unit operations 800 may terminate.

FIG. 8b illustrates a flow diagram of WICA unit operations 850 in transmitting information to a client requesting data from a service, wherein the data has already been requested by another client. WICA unit operations 850 may be indicative of operations occurring in a WICA unit, such as first WICA unit 605 or second WICA unit 615, as the WICA unit performs content caching to improve backhaul link bandwidth utilization at a content end of a TCP session. WICA unit operations 850 may occur while the WICA unit is in a normal operating mode.

WICA unit operations 850 may begin with the WICA unit receiving a request for content from a client, where the content is already been requested recently and therefore is stored in a content cache (block 855). The WICA unit may add the client to the UFS associated with the content (block 857). The WICA unit may then send content corresponding to signatures from the UFS to the client (block 859). The WICA unit may continue to send signature and/or data as long as additional data continues to arrive. WICA unit operations 850 may then terminate.

Figure 9A:
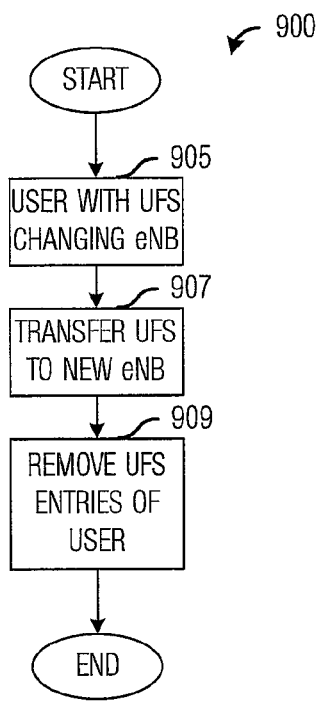
FIG. 9a is a flow diagram of first eNB operations in performing a handover for a client as the client changes from the first eNB to a second eNB.

FIG. 9a illustrates a flow diagram of first eNB operations 900 in performing a handover for a client as the client changes from the first eNB to a second eNB. First eNB operations 900 may be indicative of operations occurring in a first eNB as the first eNB is serving a mobile client, which is changing to a second eNB due to mobility of the mobile client. First eNB operations 900 may occur while the first eNB is in a normal operating mode.

First eNB operations 900 may begin with the first eNB that is serving a client with a UFS changing eNBs, for example, to the second eNB (block 905). The first eNB may transfer the UFS to the second eNB (block 907) and remove UFS entries associated with the client from its own UFS information (block 909). First eNB operations 900 may then terminate.

Figure 9B:
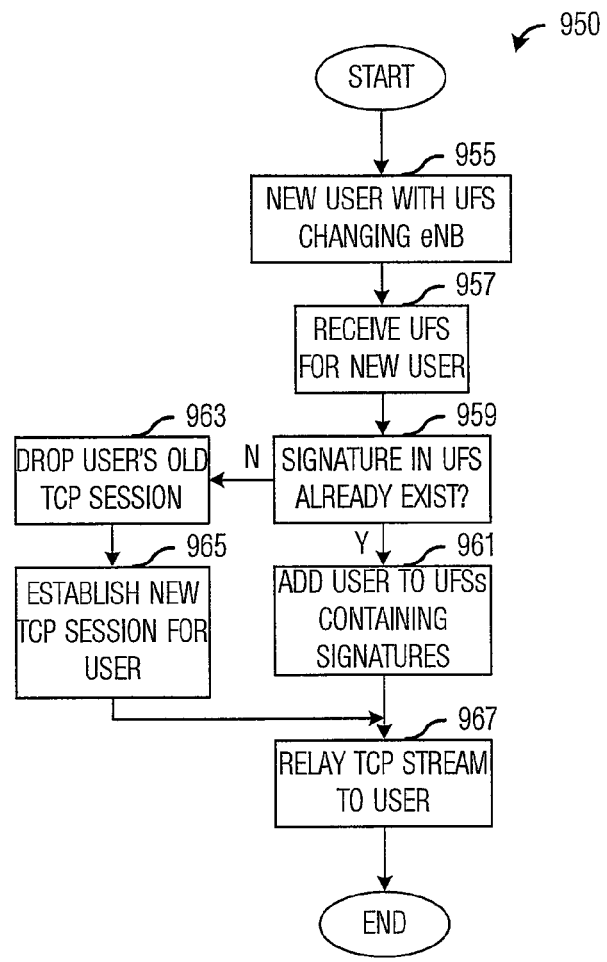
FIG. 9b is a flow diagram of second eNB operations in performing a handover for a client as the client changes from a first eNB to the second eNB.

FIG. 9b illustrates a flow diagram of second eNB operations 950 in performing a handover for a client as the client changes from a first eNB to the second eNB. Second eNB operations 950 may be indicative of operations occurring in a second eNB as the serving eNB is preparing to a mobile client, which is changing to the second eNB from first eNB due to mobility of the mobile client. Second eNB operations 950 may occur while the second eNB is in a normal operating mode.

Second eNB operations 950 may begin with the second eNB detecting that a client that is being served by the first eNB changing to be served by the second eNB (block 955). The second eNB may receive, from the first eNB, UFS entries associated with the client (block 957).

The second eNB may check the UFS entries provided by the first eNB to determine if signatures in the UFS entries already exist in its own content cache (block 959). If the signatures already exist, then the second eNB may add the client to the UFS entries containing the signatures provided by the first eNB (block 961). However, if the signatures do not exist in the content cache of the second eNB, the second eNB may drop the client's existing TCP session (block 963) and establish a new TCP session for the client (block 965). As discussed previously in FIG. 8a, establishing a new TCP session may entail creating UFS entries for the client.

The second eNB may then relay data from the TCP stream to the client (block 967). According to the embodiment, the second eNB may utilize WICA operation where possible to reduce backhaul link bandwidth utilization. Second eNB operations 950 may then terminate.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for transmitting data, the method comprising:
   receiving a block of data from a content provider;
   generating a signature from the block of data;
   determining whether the signature exists in a content cache, wherein the content cache comprises previously transmitted signatures and blocks of data associated with the previously transmitted signatures;
   when the signature exists in the content cache, saving the signature but not the block of data in a buffer;
   when the signature does not exist in the content cache, saving the block of data in the buffer; and
   transmitting contents of the buffer over a backhaul link.

2. The method of claim 1, further comprising dividing the block of data into a plurality of blocks of data, wherein the blocks of data in the plurality of blocks of data are of a same size or of variable sizes.

3. The method of claim 1, wherein saving the block of data further comprises saving the signature.

4. The method of claim 3, wherein, when the signature does not exist in the content cache, the method further comprises adding the signature and the block of data to the content cache.

5. The method of claim 4, wherein adding the signature and the block of data to the content cache comprises:
   determining whether the content cache is full;
   when the content cache is full,
      selecting a signature to be deleted, and
      saving the signature and the block of data over the signature to be deleted and a block of data associated with the signature to be deleted; and
   when the content cache is not full saving the signature and the block of data.

6. The method of claim 5, wherein selecting the signature to be deleted comprises selecting the signature to be deleted in accordance with a first in first out (FIFO) technique, a least recently used (LRU) technique, a segmented LRU technique, a least frequently used (LFU) technique, or a combination thereof.

7. The method of claim 1, wherein multiple blocks of data are received, and wherein the generating, the determining, the when the signature exists in the content cache, and the when the signature does not exist in the content cache are repeated for each block of data in the multiple blocks of data.

8. The method of claim 7, wherein the multiple blocks of data are processed in an order in which they are received.

9. The method of claim 7, wherein the multiple blocks of data are processed in an ordering of the blocks of data as specified by a source of the multiple blocks of data.

10. The method of claim 1, wherein the block of data is received responsive to a request for the block of data by a user.

11. The method of claim 10, further comprising generating a user-flow signature for the user requesting the block of data.

12. The method of claim 11, wherein saving the signature in the buffer further comprises updating the user-flow signature.

13. The method of claim 11, wherein saving the block of data in the buffer further comprises saving the block of data in the user-flow signature.

14. The method of claim 13, wherein saving the block of data in the buffer further comprises:
   saving the signature in the buffer; and
   saving the signature in the user-flow signature.

15. The method of claim 1, wherein generating the signature comprises applying a hashing function to the block of data.

16. The method of claim 1, wherein the contents of the buffer are transmitted to multiple recipients over multiple communications links.

17. A wireless intelligent content acceleration (WICA) unit comprising:
   a processor; and
   a computer readable storage medium storing programming for execution by the processor, the programming including instructions to
      receive a block of data from a content provider,
      generate a signature from the block of data,
      determine whether the signature exists in a content cache, wherein the content cache comprises previously transmitted signatures and blocks of data associated with the previously transmitted signatures,
when the signature exists in the content cache, save the signature but not the block of data in a buffer,
when the signature does not exist in the content cache, save the block of data in the buffer, and
transmit contents of the buffer over a backhaul link.

18. The WICA unit of claim 17, wherein the programming further includes instructions to divide the block of data into a plurality of sub-blocks of data.

19. The WICA unit of claim 17, wherein the programming further includes instructions to, when the signature does not exist in the content cache, add the signature and the block of data to the content cache.

20. The WICA unit of claim 19, wherein the instructions to add the signature and the block of data to the content cache comprises instructions to:
determine whether the content cache is full;
when the content cache is full
select a first signature to be deleted, and
save the signature and the block of data over the first signature and a first block associated with the first signature; and
when the content cache is not full, save the signature and the block of data.

21. The WICA unit of claim 17, wherein the programming further includes instructions to:
receive a plurality of blocks of data comprising the block of data; and
process the plurality of blocks of data comprising to
generate a plurality of signatures corresponding to the plurality of blocks of data,
determine whether the plurality of signatures exists in the content cache,
when signatures of the plurality of signatures exists in the content cache, save the signatures but not the corresponding blocks of data in the buffer, and
when the signatures of the plurality of signatures does not exist in the content cache, save the corresponding blocks of data in the buffer.

22. The WICA unit of claim 21, wherein the programming further includes instructions to process the plurality of blocks of data in an order in which they are received.

23. The WICA unit of claim 21, wherein the programming further includes instructions to process the plurality of blocks of data in an order specified by a source of the plurality of blocks of data.

24. The WICA unit of claim 17, wherein the instructions to generate the signature from the block of data comprise instructions to apply a hashing function to the block of data.

25. The WICA unit of claim 17, wherein the programming further includes instructions to transmit the contents of the buffer over a plurality of communications links.

* * * * *